United States Patent
Haartsen et al.

(10) Patent No.: US 8,055,291 B2
(45) Date of Patent: *Nov. 8, 2011

(54) POWER-AWARE LINK ADAPTATION IN A WIDEBAND CDMA SYSTEM

(75) Inventors: Jacobus Cornelis Haartsen, Hardenberg (NL); Bengt Lindoff, Bjärred (SE); Anders Wallén, Eslöv (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1035 days.

This patent is subject to a terminal disclaimer.

(21) Appl. No.: 11/854,135

(22) Filed: Sep. 12, 2007

(65) Prior Publication Data

US 2009/0067355 A1 Mar. 12, 2009

(51) Int. Cl.
*H04B 7/00* (2006.01)
(52) U.S. Cl. ........... 455/522; 455/69; 455/450; 455/464
(58) Field of Classification Search .............. 455/522, 455/67.11, 68–70, 127.1, 127.5, 574, 343.5, 455/450, 451, 452.1, 464, 509, 516, 517; 370/318, 236.1, 395.41, 332; 375/E7.141
See application file for complete search history.

(56) References Cited

U.S. PATENT DOCUMENTS

| | | | |
|---|---|---|---|
| 5,491,832 A | 2/1996 | Malkamaki et al. | |
| 5,642,384 A | 6/1997 | Ramesh | |
| 6,088,332 A * | 7/2000 | Suters et al. | 370/235 |
| 6,473,506 B1 | 10/2002 | Hook et al. | |
| 6,603,751 B1 | 8/2003 | Odenwalder | |
| 6,985,538 B2 | 1/2006 | Murakami et al. | |
| 7,356,346 B2 | 4/2008 | Gopalakrishnan et al. | |
| 7,376,121 B2 * | 5/2008 | Dunagan et al. | 370/351 |
| 2002/0177446 A1 | 11/2002 | Bugeja et al. | |
| 2003/0022683 A1 | 1/2003 | Beckmann et al. | |

(Continued)

FOREIGN PATENT DOCUMENTS

| | | |
|---|---|---|
| EP | 0 907 296 | 4/1999 |
| EP | 1 473 885 | 11/2004 |
| EP | 1 760 908 | 3/2007 |
| WO | 2006/044901 | 4/2006 |
| WO | 2006/077141 | 7/2006 |

OTHER PUBLICATIONS

Kaemarungsi et al., "On the Use of Adaptive OFDM to Preserve Energy in Ad Hoc Wireless Networks," Proceedings of 13th MPRG/Virginia Tech Symposium on Wireless Personal Communications, Jun. 2003, pp. 1-12, retrieved from the Internet: http://www.scalable-networks.com/pdf/MPRG_May03_Kamol.pdf.

(Continued)

*Primary Examiner* — Dominic E Rego
(74) *Attorney, Agent, or Firm* — Coats & Bennett, P.L.L.C.

(57) ABSTRACT

Methods and apparatus are disclosed for reducing mobile terminal energy consumption during data transmissions by allocating link resources and adapting link parameters in an energy-aware manner, based on throughput requirements and prevailing channel conditions. A combination of transmit parameters that includes a transmit channelization scheme and is designed to minimize the total energy consumed during data transmission is selected based on a throughput requirement and one or more channel conditions associated with the data transmission. The channelization scheme includes a number of subchannels to be used and subchannel configuration parameters for each subchannel, such as spreading codes, spreading factors, and subchannel power levels. The combination of transmit parameters may also include a modulation format, coding scheme, and transmit power setting, as well as parameters relating to multiple-antenna transmit schemes.

22 Claims, 5 Drawing Sheets

U.S. PATENT DOCUMENTS

| | | | |
|---|---|---|---|
| 2003/0088797 A1 | 5/2003 | Gaur | |
| 2004/0022218 A1 | 2/2004 | Kim et al. | |
| 2004/0160914 A1* | 8/2004 | Sarkar | 370/329 |
| 2004/0179497 A1* | 9/2004 | Foore et al. | 370/335 |
| 2005/0113120 A1 | 5/2005 | Rappaport et al. | |
| 2005/0180374 A1* | 8/2005 | Balachandran et al. | 370/343 |
| 2005/0215265 A1 | 9/2005 | Sharma | |
| 2005/0245258 A1* | 11/2005 | Classon et al. | 455/434 |
| 2006/0007849 A1* | 1/2006 | Kim et al. | 370/208 |
| 2006/0023680 A1* | 2/2006 | Oh et al. | 370/338 |
| 2006/0057978 A1 | 3/2006 | Love et al. | |
| 2006/0067417 A1* | 3/2006 | Park et al. | 375/260 |
| 2006/0109931 A1 | 5/2006 | Asai et al. | |
| 2006/0153309 A1* | 7/2006 | Tang et al. | 375/260 |
| 2006/0240834 A1 | 10/2006 | Sawaya et al. | |
| 2007/0086367 A1 | 4/2007 | Sung et al. | |
| 2007/0111735 A1* | 5/2007 | Srinivasan et al. | 455/456.1 |
| 2007/0189235 A1 | 8/2007 | Chandra et al. | |
| 2007/0189404 A1 | 8/2007 | Baum et al. | |
| 2007/0217339 A1 | 9/2007 | Zhao | |
| 2007/0230327 A1* | 10/2007 | Cho et al. | 370/208 |
| 2007/0270170 A1* | 11/2007 | Yoon et al. | 455/509 |
| 2008/0009243 A1 | 1/2008 | Hart | |
| 2008/0146154 A1 | 6/2008 | Claussen et al. | |
| 2008/0159122 A1* | 7/2008 | Dor | 370/208 |
| 2008/0159246 A1* | 7/2008 | Niemela | 370/339 |
| 2009/0067355 A1* | 3/2009 | Haartsen et al. | 370/311 |
| 2010/0111027 A1 | 5/2010 | Hart | |
| 2011/0080923 A1* | 4/2011 | McCloud et al. | 370/479 |
| 2011/0090827 A1* | 4/2011 | Kattwinkel | 370/295 |

OTHER PUBLICATIONS

Zhu et al., "A Power Efficient Adaptive Modulation Scheme over Fading Channel," IEEE International Conference on Communications, Circuits and Systems and West Sino Expositions, Jun. 29-Jul. 2, 2002, pp. 257-261, IEEE, Piscataway, NJ, US.

De La Kethulle De Ryhove, Sebastian et al. "A Design Methodology for Link Adaptation Schemes using Constellation of Constant PAPR." IEEE Conference on Communications, 2006 (ICC '06). vol. 9, pp. 4321-4326.

Jayanthi, K. et al. "A Link Adaptive Power Control Scheme for Wideband CDMA System." 2005 IEEE 7th Malaysia International Conference on Communication Networks. Nov. 16-18, 2005. vol. 2, pp. 833-837.

Lilja, Harri et al. "WCDMA Uplink Modulation Scheme Evolution and Transmitter Implementation." IEEE 50th Vehicular Technology Conference. VTC 1999—Fall. vol. 2, pp. 899-903.

Tang, Fei et al. "Optimization of Link Adaptation with a Practical Power Consumption Model." IEEE 57th Semiannual Vehicular Technology Conference. VTC 2003—Spring. vol. 2, pp. 1340-1344.

Yang, Kai et al. "Battery-Aware Adaptive Modulation with QoS Constraints." IEEE Transactions on Communications. vol. 54, No. 10, Oct. 2006, pp. 1797-1805.

Qiao, D. et al. "Adaptive Transmit Power Control in IEEE 802.11a Wireless LANs." In Proceedings of IEEE (VTC 2003-Spring), Jeju, Korea, Apr. 22-25, 2003, pp. 433-437.

Qiao, D. et al. "Energy-Efficient PCF Operation in IEEE 802.11a WLANs via Transmit Power Control." Computer Networks (Elsevier), vol. 42, No. 1, May 2003, pp. 39-54.

3GPP TR 25.814 V7.1.0(Sep. 2006). 3rd Generation Partnership Project; Technical Specification Group Radio Access Network; Physical layer aspects for evolved Universal Terrestrial Radio Access (UTRA) (Release 7). pp. 87-90.

Myung, H. et al. "Single Carrier FDMA for Uplink Wireless Transmission." IEEE Vehicular Technology Magazine, Sep. 2006, pp. 30-38.

* cited by examiner

POWER-AWARE LINK ADAPTATION IN A WIDEBAND CDMA SYSTEM

CROSS REFERENCES TO RELATED APPLICATIONS

This application is related to U.S. patent application "Power-Aware Link Adaptation with Variable Bandwidth Allocation" by Jacobus Cornelis Haartsen, Anders Wallén, and Bengt Lindoff, Ser. No. 11/853,068, filed 11 Sep. 2007, assigned to the present assignee, and hereby incorporated by reference.

BACKGROUND

1. Technical Field

The present invention generally relates to methods and apparatus for adapting transmit parameters to radio conditions in a wireless communications system, and particularly relates to adapting mobile terminal transmit parameters, including CDMA spreading parameters, in order to reduce the energy consumption and extend the battery life of the mobile terminal.

2. Background

The design of the uplink (or reverse link) signal transmitted from the mobile terminal to a base station, or "Node B", presents difficult challenges in advanced cellular systems such as Wideband Code Division Multiple Access (W-CDMA) systems. The demand for higher data rates drives the design of more advanced modulation schemes. These advanced modulation schemes, in turn, create new challenges for the design of cost-effective, energy-efficient portable devices. In particular, these advanced uplink designs tend to increase power consumption at the mobile terminal and place heavier demands on the batteries of portable devices.

A key component of a mobile terminal's power consumption is the power consumed by the terminal's transmitter power amplifier (PA). In order to maximize the efficiency of the power amplifier, the uplink signal format should have a low Peak-to-Average-Power Ratio (PAPR). The best case, in terms of power amplifier efficiency, is a constant-envelope modulation, in which the information resides only in the phase of the carrier. A constant-envelope scheme permits the use of non-linear (class C) PAs, which can be operated with high efficiency. The widespread GSM system, for example, uses a modulation scheme of this type.

However, more advanced modulation schemes, where information also resides in the amplitude of the modulated carrier, are increasingly used to increase data rates and more efficiently utilize limited spectrum resources. These modulation schemes cause higher PAPRs on the transmitted signals, and thus put higher demands on the PAs. In particular, the PAs must meet more stringent linearity requirements, and thus tend to operate less efficiently. Accordingly, for a given transmit power, more power is consumed and more energy is drained from the mobile terminal's battery.

W-CDMA systems use spread spectrum technology, where a channel is defined by a spreading code. In first generation W-CDMA terminals, a single channelization code is used, and the uplink signal is formed by combining an in-phase (I) and quadrature (Q) branch, each modulated with BPSK. The resulting PAPR is acceptable, but the peak data rate is limited to 384 kb/s. In the second generation, called High Speed Packet Access (HSPA), up to four subchannels with corresponding spreading codes are used, but low-order phase modulation is still used. To achieve the highest peak data rates, up to 5.76 Mb/s, very low spreading factors are used. In the current development of enhancements to HSPA (so-called HSPA+), higher-order modulation formats, such as 16-QAM, are being considered. In addition, more than four subchannels may be used. Finally, multiple-input multiple-output (MIMO) antenna techniques are also being standardized. These measures will increase the peak rate, but generally at the expense of increased PAPR. Therefore, power consumption and battery life in future mobile terminals continue to be challenged.

SUMMARY

The present invention provides methods and apparatus for reducing mobile terminal energy consumption during a data transmission by allocating link resources and adapting link parameters in an energy-aware manner, based on throughput requirements and prevailing channel conditions. The methods described are particularly useful in lightly loaded networks where underutilized system capacity can be exchanged for improved energy consumption, and hence improved battery life, in mobile terminals.

In one exemplary embodiment, a mobile terminal selects transmit parameters by determining a throughput requirement and one or more channel conditions associated with the data transmission and selecting, based on the throughput requirement and the channel conditions, a transmit channelization scheme designed to minimize the total energy consumed during data transmission. The selected channelization scheme includes a number of subchannels to be used and corresponding subchannel configuration parameters, which may include a spreading code and a spreading factor for each subchannel. Transmit parameters considered and selected along with the channelization scheme may also include a modulation format, coding scheme, and transmit power setting, as well as parameters relating to a multi-antenna transmission scheme. In certain embodiments, the transmit channelization scheme may also include a subchannel power level for each subchannel.

In one or more embodiments, a mobile terminal sends a request for resource allocation to a base station. The contents of this request are based on the selected transmit channelization scheme. In response, the base station determines a schedule for allocation of link resources to the mobile terminal, and sends a message indicating the allocated resources.

In another embodiment, a fixed node in a wireless communications system, such as a Node B in a W-CDMA system, receives throughput requirement information and channel condition information from a mobile terminal. The fixed node uses that information to select a transmit channelization scheme for the mobile terminal, the transmit channelization scheme again designed to minimize energy consumption by the mobile terminal transmitter. The fixed node may also use resource requirements associated with one or more other mobile terminals to select the channelization scheme.

DETAILED DESCRIPTION

The present invention provides methods and apparatus for reducing mobile terminal energy consumption during data transmissions. The methods described are particularly useful in lightly loaded networks where underutilized system capacity can be exchanged for improved energy consumption, and hence improved battery life, in mobile terminals. Although the following description illustrates the present invention as applied to a W-CDMA system using HSPA or HSPA+, those skilled in the art will recognize that the techniques of the present invention may also be applied to other CDMA-based wireless communications systems. Furthermore, although the techniques of the present invention are described below in the context of a mobile terminal communicating with a fixed base station, those skilled in the art will appreciate that these techniques may also be applied to mobile-to-mobile transmissions, such as in an ad-hoc network or relay scenario.

Figure 1:
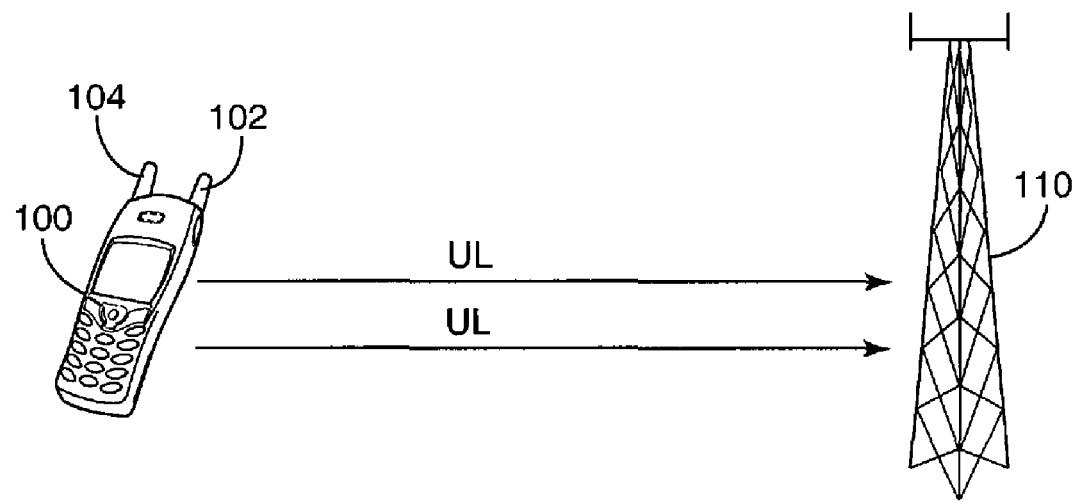
FIG. 1 is a block diagram of one embodiment of a wireless communications system.

FIG. 1 illustrates a mobile terminal 100 and a base station 110 in a W-CDMA wireless communications system. The mobile terminal 100 transmits voice and other signals to the base station 110 over one or more uplink (UL) channels. The mobile station 100 also receives voice and other signals from the base station 110 over one or more downlink channels (not shown). In the exemplary embodiment pictured in FIG. 1, the mobile terminal 100 includes two antennas 102 and 104, which may be employed for transmit diversity, including advanced multiple-input-multiple-output (MIMO) schemes, receive diversity, or both.

The advanced modulation techniques applied in W-CDMA, especially in HSPA and HSPA+, are designed to increase the peak rates to improve overall data throughput on shared channels. However, these advanced modulation techniques put increased demands on the power consumption of mobile terminals. Often, applications running on mobile terminals do not require the very highest data rates permitted, so these terminals are not operated under the very highest throughput conditions that correspond to these high peak rates. Therefore, uplink scheduling and link adaptation schemes are used to give a mobile terminal only the resources on the shared channel that it needs.

To date, these scheduling and link adaptation schemes have been developed to optimize network capacity and overall system throughput, given the range and rate requirements of the mobile terminals. As a result, these existing scheduling and link adaptation approaches do not take into account the power and energy consumption of the terminal. In many cases, all or part of a cellular network may be underutilized, or "lightly loaded." In those circumstances, optimizing system throughput is less important, and energy concerns can be emphasized.

Disclosed herein are methods and apparatus for link adaptation that reduce the energy consumed in a mobile terminal during transmissions. Parameters that can be adapted include a transmit channelization scheme, which may include, but is not limited to, a number of CDMA subchannels to be used, a spreading factor for each subchannel, and a spreading code for each subchannel. Additional transmit parameters that may be considered and adapted include the transmit power level, a modulation format or formats, error correction coding parameters, and the power used for each spreading code (beta factor).

When the path loss and dispersion in the reverse channel is known, the performance in the Node B receiver can be predicted for all possible combination of the adaptable parameters for an uplink transmission. As will be discussed in detail below, certain combinations will result in lower energy consumption at the mobile transmitter. In particular, by choosing the proper combination of channelization scheme, coding, modulation format, and transmit power level, the peak transmit power can be reduced, or the efficiency of the power amplifier (PA) can be improved, or both.

Of course, transmission time must also be considered. Some combinations of the above parameters will result in a reduced peak data rate, and therefore may increase the transmission time needed to transfer a given quantity of data. Under some circumstances, this increase in transmission time will increase the total energy consumption, even if the transmit power level is reduced or the efficiency of PA operation is improved. In other circumstances, the improvements in PA power consumption will more than offset the increased energy consumption caused by an increase in transmission time.

As will be discussed more fully below, power consumption by the power amplifier only dominates the total mobile terminal power consumption under some circumstances, particularly when the mobile terminal is near the cell edge and is transmitting at high transmit power levels. In these cases, the power consumption of the PA dominates and selection of parameters to improve PAPR may have a dramatic effect on PA power consumption and thus on the overall power consumption of the mobile terminal. Hence, the increased transmission time that may sometimes be necessary to allow the selection of transmit parameters resulting in the lower PAPR may have less effect on the total energy consumption than the improvement in PAPR.

In contrast, in the so called low-power domain, the mobile terminals are close to the base station and the PA may only contribute little to the total power consumption. Under these circumstances, other circuitry in the mobile terminal transmitter dominates the overall power consumption, and a different set of parameters must be selected to achieve optimal energy consumption. For example, in the low-power domain, modulation formats with high peak rates are generally favorable because they shorten the total transmission time.

As will be shown below, the selection of the best combination of parameters can be determined in the mobile terminal and then communicated to the base station. Alternatively, a parameter set for a given mobile terminal is determined in the base station, where the needs of other mobile terminals can be taken into consideration as well.

Figure 2:
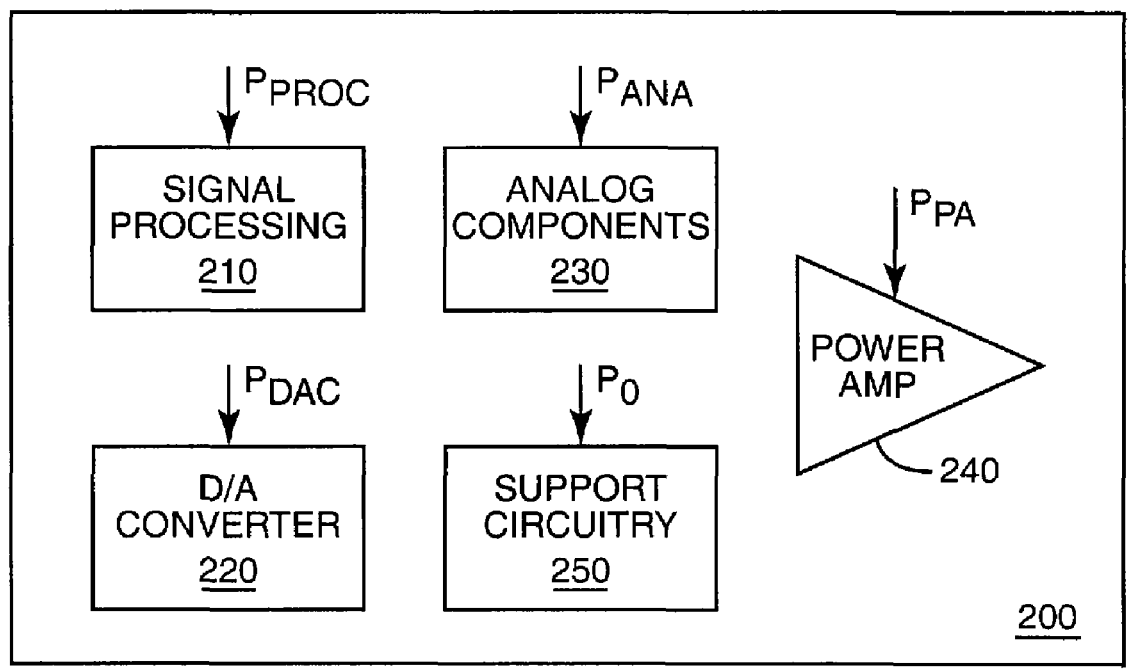
FIG. 2 is a block diagram illustrating one embodiment of a transmitter.

A functional representation of a W-CDMA transmitter 200, such as might be included in mobile terminal 100, is illustrated in FIG. 2. Symbols to be transmitted are produced in signal processing block 210, and pass through the digital-to-analog converter (DAC) 220, analog conditioning block 230, and power amplifier 240 before transmission to the base station 110. Support circuitry 250 may comprise clocks, local oscillators, power converters, etc. The power consumed by these functional blocks will vary during data transmission, depending on the transmit parameters discussed above. In addition, the total energy consumed by these blocks will also vary for each possible combination of transmit parameters. Finally, some of these functional blocks may be duplicated in order to implement a MIMO scheme. The selected combination of transmit parameters, then, will ultimately affect the mobile terminal's battery life.

The overall power consumption $P_{tot}$ of the transmitter portion of a mobile transmitter during a transmission can be modeled by the following formula:

$$P_{tot}=P_0+P_1(R)+P_{pa}(P_{out}).$$

$P_0$ is the contribution from support circuitry 250 that generally does not vary directly with modulation format, coding schemes, spreading parameters, or transmit power level. Although the circuits that consume $P_0$ may be switched off between transmissions, $P_0$ is otherwise independent of the transmit parameters. Energy consumption from $P_0$ thus varies only with the duration of a data transmission.

$P_1$ is the contribution that depends on the information rate R, where R represents the bits that are being processed during each interval of time. Variations in power consumption due to changes in R may appear in the DAC circuitry 420 and in signal processing circuits 410, as a result of variations in clock speed, or if different logic blocks are required to support variations in R. Changes in modulation format, coding scheme, and spreading factors all influence R, and thus $P_1$.

Finally, $P_{pa}$ is the contribution from the PA, which is determined by the efficiency of operation of the PA and the transmit power level $P_{out}$ (i.e. the power of the transmitted radio wave). The efficiency of the PA depends, among other things, on the PA biasing, which in turn depends on the transmit power level $P_{out}$ and the PAPR of the transmitted signal. A transmitted signal with a higher PAPR requires a larger back-off (e.g. from the 1-dB compression point) in the PA in order to reduce signal distortion and spurious emissions; the larger back-off results in lower efficiency. Reducing the PAPR allows the PA biasing to be adjusted for a given transmit power level to improve the efficiency and reduce transmitter power consumption.

The required transmit power level depends primarily on propagation conditions, but also on other factors. For example, the choice of transmitter parameters such as modulation format, spreading factors, and coding schemes may affect the required transmit level because the minimum signal level required at the base station receiver varies with the selected transmit parameters. So, the transmit power level $P_{out}$ will vary with propagation loss (caused by distance and shadowing), receiver sensitivity at the base station 110 (which may vary with the selected transmitter parameters), and any fading margin added to avoid outages.

Some of the preceding factors are controlled within the wireless communications system, for example, by base station 110, or are dictated by design choices; others are not. Propagation loss is determined by the relative position of the mobile terminal 100 and the base station 110, as well as the environmental conditions. This variable changes over time and cannot be controlled. The base station receiver sensitivity depends, among other things, on applied modulation format. For example, 16-QAM has a higher $E_b/N_o$ requirement than QPSK for the same bit error rate. The choice of coding also affects the receiver sensitivity. Applying a simpler modulation format and coding reduces the required $P_{out}$ at the expense of a lower effective information rate and thus a longer transmission burst required to transmit the same number of information bits. A fading margin must generally be added to counteract dispersion in the channel. Diversity, which may include diversity achieved by increasing the RF bandwidth, reduces the fading margin required to achieve a given outage probability. A lower fading margin, in turn, reduces the required $P_{out}$.

Although the power amplifier power consumption is often quite large, the energy consumed by the power amplifier does not always dominate the total transmitter energy consumption. When the mobile terminal 100 is close to the base station 110, $P_{pa}$ may actually be relatively low compared to other components of the overall power consumption. In addition, because the efficiency of the power amplifier will vary with transmit power level, a fractional reduction in $P_{out}$ will not always result in the same fractional reduction of $P_{pa}$.

Much of the preceding discussion assumes that the mobile terminal 100 includes only one transmitter chain. If MIMO is employed, several of the functional blocks illustrated in FIG. 2 may be duplicated for each transmitter. Thus, the particular MIMO scheme employed may have a dramatic effect on the power and energy consumption of the transmitter section of mobile terminal 100. To the extent that the MIMO scheme may be varied over time, the parameters defining the MIMO scheme, such as parameters defining precoding schemes, spatial multiplexing schemes, and/or diversity coding schemes, will also affect the power and energy consumption of the mobile terminal 100. These parameters will also interact with the other factors discussed above.

From the description above, it will be clear that there are several parameters that impact energy consumption at mobile terminal 100, and frequently in non-obvious ways. A lower peak data rate may reduce both $P_1(R)$ and $P_{pa}$, but may also lengthen the transmission burst. If mobile terminal is close to the base station, then $P_{pa}$ may not be the dominant term in the formula; reducing it may not have a big impact, whereas an increased burst duration may increase the total energy consumption. So, whether or not a decrease in the peak data rate is beneficial or not may depend on whether mobile terminal 100 is in the low-power or high-power domain.

Importantly, in the W-CDMA context, transmitter parameters that may be varied include the choice of how many subchannels to use, as well as subchannel configuration parameters for each subchannel. These subchannel configuration parameters may include the spreading codes, spreading factors, and power levels applied to each subchannel. The choice of these parameters, in combination with the choice of modulation format and coding schemes, will affect the peak data rate of the transmitted signal, but will also impact the PAPR. Thus, the choice of these parameters will also affect the overall energy consumption of mobile terminal 100. The tradeoffs inherent in the selection of these parameters can be exploited to reduce this energy consumption, particularly when the wireless system's capacity is underutilized.

Figure 3:
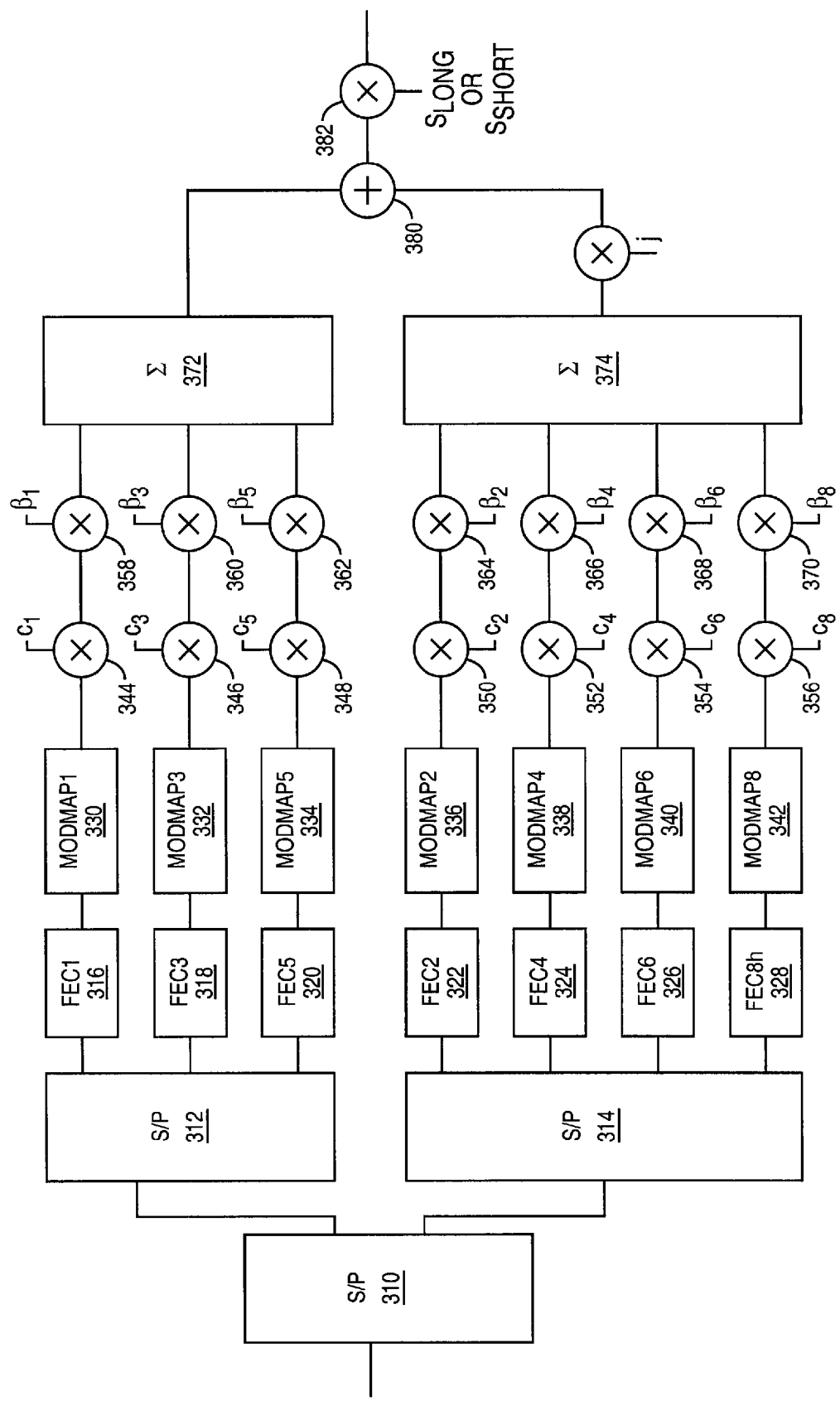
FIG. 3 is another block diagram illustrating one embodiment of a transmitter according to the invention.

FIG. 3 is a block diagram of a transmitter embodiment according to the current invention. At demultiplexer 310, data bits to be transmitted are split and fed separately to an in-phase (I) and quadrature (Q) branch. On each branch, the bits are further de-multiplexed over several subchannels, using demultiplexers 312 and 314. Next, forward error correction (FEC) coding is applied separately to each branch, using coders 316, 318, 320, 322, 324, 326, and 328. In the embodiment of FIG. 3, subchannel coding may be applied independently to each stream, using the same or different coding schemes. Alternatively, a channel coding scheme could be applied earlier, before one or both of the serial-parallel converters.

Following the FEC coding, each of the data streams flows through modulation mappers 330, 332, 334, 336, 338, 340, and 342, where groups of bits from each data stream are mapped to symbols. Generally, the modulation mappers 330-342 will apply a form of pulse amplitude modulation (PAM), selected in view of the desired modulation for the composite output signal. For example, binary PAM is used for a QPSK composite signal at the transmitter output, as BPSK on each of the I and Q branches will yield a QPSK output. Similarly, quaternary PAM may be used to produce a 16-QAM output; 8-order PAM may be used to obtain 64-QAM.

After coding and modulation, each signal is spread with code $c_i$, using spreaders 358, 360, 362, 364, 366, 368, and 370, respectively. Each spreader 358-370 uses a different spreading code $c_i$, producing CDMA subchannels. In addition, the spreading factor for each spreader 358-370 may be selected independently. Next, sub-channel power levels $\beta_i$ are allocated to each channel at blocks 358, 360, 362, 364, 366, 368, and 370. As with the spreading factors, each sub-channel power level $\beta_i$ may be selected independently of the others, although all may be identical.

Next, the sub-channel signals are accumulated at blocks 372 and 374, and the I and Q branches are combined at summer 380, to produce the complex baseband signal. This signal is then scrambled with a transmitter-specific scrambling code ($s_{long}$ or $s_{short}$) at block 382 and upconverted to radio frequencies for transmission (not shown). Finally, the upconverted signal is amplified by the power amplifier (not shown) and sent to the transmit antenna (not shown).

From FIG. 3 it is apparent that several parameters may be selected to define a channelization scheme, i.e., to assemble a composite output signal for transmission. These parameters include the number of subchannels to be used, the forward-error correction to be used for each subchannel, the modulation format to be applied, and the code sequence and power levels to be applied to each subchannel. The choice of these parameters affects the effective data rate of the transmitted signal, and also affects the PAPR. The resulting PAPR and data rate have a predictable effect on the energy consumption for a given data burst at a given power level.

In addition, the performance of the receiver at the other end of the link can be predicted for each possible combination of these parameters, given an estimate of the path loss between the transmitter and receiver and a transmitter power level. Thus, those skilled in the art will readily appreciate that the minimum power level necessary to maintain the data link can also be predicted. Accordingly, the overall energy consumption of the transmitter can also be predicted.

Of the several factors and parameters discussed above, two factors are uncontrolled by the system: channel conditions (such as path loss) and required throughput. The former is determined by the physical environment, while the latter is determined by the mobile terminal user's application. The transmit parameters discussed above are controlled by the system, although each may be constrained by design limitations or capacity constraints. Ordinarily, these transmit parameters are selected to optimize system throughput. However, especially when the wireless system capacity is underutilized, an optimal combination of transmit parameters, in terms of reduced transmitter energy consumption, can be determined for any combination of channel conditions and required throughput.

The optimal combination of transmit parameters for a range of conditions may be calculated as needed, but may also be pre-calculated and stored in memory for later retrieval. A model is constructed for a particular mobile terminal design, or for an entire class of mobile terminals, to determine the power consumed for various combinations of path loss and throughput requirements. For example, for each combination of path loss and throughput requirement, each of a variety of channelization schemes may be analyzed to determine the resulting transmit power level requirement as well as the impact on transmission time. If applicable, various combinations of MIMO schemes may be analyzed in conjunction with the other parameters. These parameters are then used with the model to determine the overall energy consumption for each possible combination of transmit parameters. Then, the combination resulting in the lowest energy consumption will be readily apparent. These optimal combinations may be stored, for example, in a lookup table indexed by path loss and throughput requirement, so that they are readily retrievable.

Figure 4:
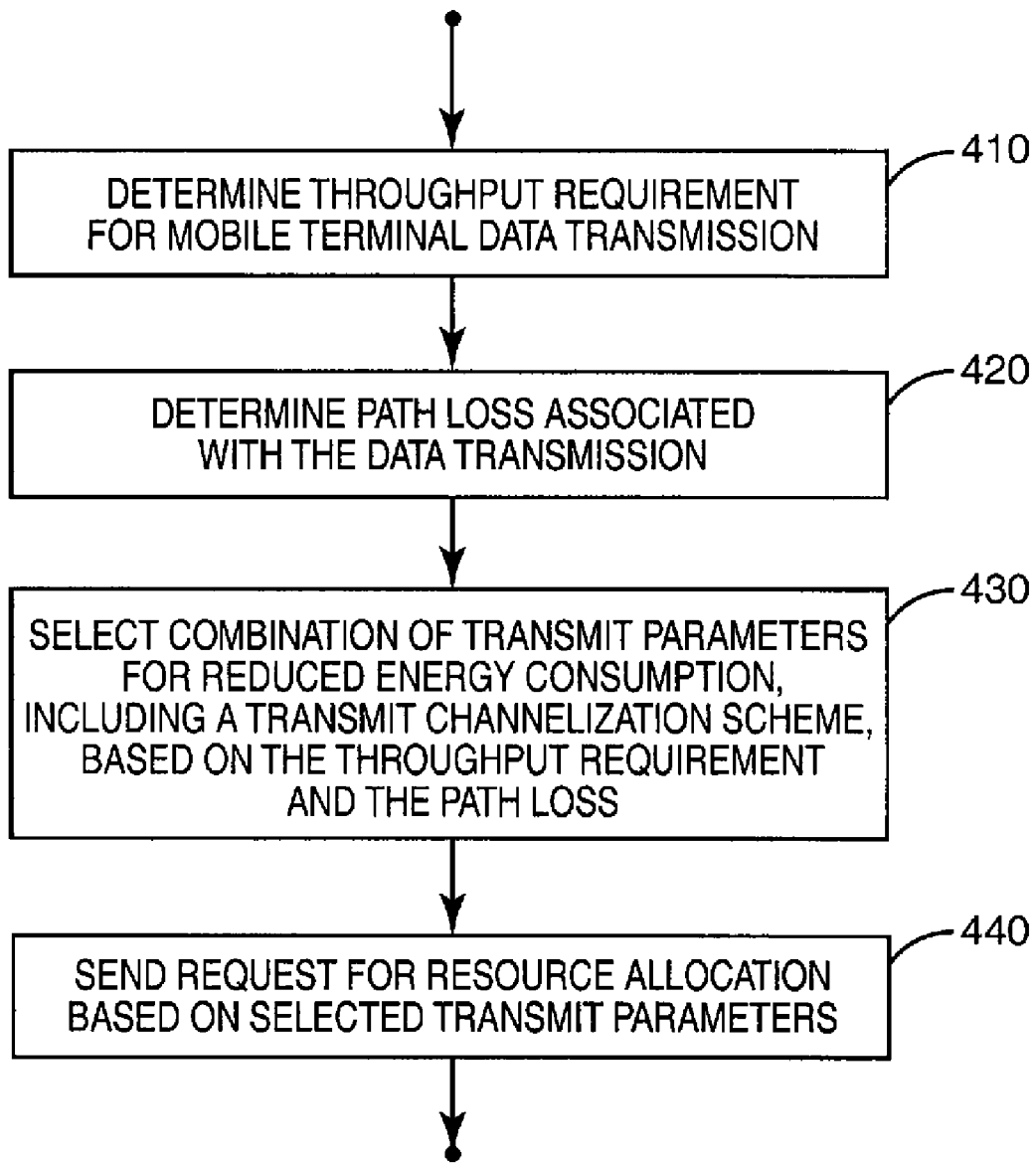
FIG. 4 is a flow diagram illustrating one embodiment for determining transmit parameters for a mobile terminal.

FIG. 4 illustrates an exemplary method, which may be implemented at mobile terminal 100, for determining transmit parameters for data transmission by mobile terminal 100. With this method, a set of transmit parameters that reduces the overall energy consumption of the mobile terminal transmitter for a planned transmission may be selected, based on the current channel conditions and the throughput requirements of the application(s) executing on mobile terminal 100.

At block 410, a throughput requirement is determined. For certain applications, such as a voice call or video conference, the throughput requirement is based on a minimum average data rate required to maintain an acceptable quality of service. In addition to average data rate, latency is also a factor in these real-time applications. However, these requirements can in general be cast as a throughput requirement, in that a certain number of bits must be transmitted in a certain interval of time. With a voice call or video conference, the total duration of the session is of course unknown a priori. Accordingly, a throughput requirement for a real-time application may be expressed as the number Y of bits required to be transmitted in the next Z time intervals.

A bulk transfer of data, such as for an upload of a camera image or video clip, will generally not require the same qualitative level of service as real-time applications such as video conferencing. Theoretically, the transmission of a data file could be spread over many—sub-frames in order to minimize overall energy consumption. Of course, the mobile terminal user's perception of the quality of the service provided will be influenced by the overall speed of file transfer. This perception will ultimately set a lower bound for the throughput requirement.

The size of the file to be transferred may influence the minimum throughput requirement. For many applications, transferring a file in a few seconds will appear to the user as virtually instantaneous. Thus, if the file is relatively small, the average throughput required to make the transfer appear fast may be relatively low. For larger files, the average throughput required to satisfy user expectations may be larger.

In either event, determining the throughput requirement for a bulk data transfer begins with determining the number of total bits to be transferred. An average rate may be computed as a function of the total number of bits, or a minimum throughput may be predetermined for certain applications, or for all bulk data transfers. In any event, a throughput requirement, such as that at least Y bits be transferred over the next Z time intervals, may be determined for bulk data transfers as well as for real-time applications.

At block 420, the path loss applicable to data transmissions from the mobile is determined. Other channel conditions, such as dispersion may also be estimated, but the path loss has the most direct impact on the required transmit power level. The path loss may be estimated by any or several of a variety of techniques known to those skilled in the art. For instance, mobile terminal 100 determines the path loss by measuring received signal power for forward link reference symbols, and compares the measured received power to the value of the transmitted power, which the mobile terminal 100 extracts from layer 3 messages received from the base station 110. Other propagation-related information, such as Doppler, power-delay profiles, etc., may be incorporated into the path loss determination process, to provide for an appropriate fading margin, or to compensate for mismatches between the reverse channel and forward channel path losses.

At block 430, a transmit channelization scheme is selected, based on the throughput requirement and the path loss determined at blocks 410 and 420, respectively. As discussed above, a lookup table, stored in memory of mobile terminal 100 and indexed by a throughput parameter and a path loss parameter, may have been constructed, with entries corresponding to a combination of transmit parameters designed to minimize, or at least reduce, transmitter energy consumption, for the given combination of path loss and throughput requirement. The entries in the lookup table may comprise one or more parameters indicating an optimal number of subchannels to be used and the corresponding spreading codes and spreading factors, as well as a modulation format and coding scheme. Where applicable, the entries may also comprise parameters defining a MIMO scheme. A target transmit power level may also be retrieved from the lookup table, or the transmit power level may be calculated in light of the selected parameters.

At block 440, mobile station 100 sends a request for a resource allocation to the base station 110. The contents of this request are based on the transmit channelization scheme and other transmit parameters selected at block 430. For example, the message sent to base station 110 may comprise a specific request for a certain number of time slots, as well as a specific channelization scheme, modulation format and coding scheme. Alternatively, the request may indicate a range of resource allocations. In either case, the request is based on the selected transmit parameters, which are designed to minimize the energy consumed by the mobile terminal transmitter.

In response to the request for resource allocation, base station 100 (or other associated network node) determines a schedule for allocation of reverse link resources to mobile station 100. If capacity is constrained, this schedule may not be able to accommodate the request, i.e. a less efficient allocation of resources may be required. However, in many circumstances, particularly when the network is lightly loaded, matching the schedule to the resource request is possible. In either event, a message indicating the allocated resources, modulation formats, etc., may then be sent to the mobile terminal 100. This message determines the transmitter settings used by mobile terminal 100 in the subsequent data transmission.

Figure 5:
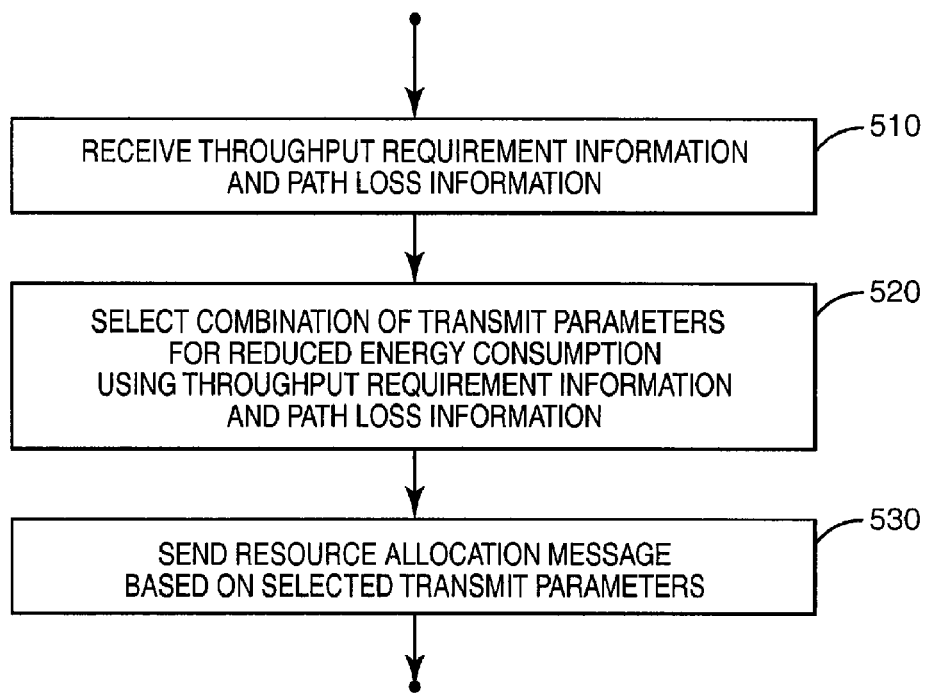
FIG. 5 is a flow diagram illustrating an exemplary method implemented at a fixed network node.

FIG. 5 illustrates a variation of the above method that may be implemented at the base station 110 or other fixed node in the wireless communications system, such as the Node B or RNC of a W-CDMA system. Performing the method on the fixed side of the network may in some circumstances make it more convenient to account for the resource needs of other mobile stations in evaluating the trade-offs between network capacity and energy-efficient allocation of link resources.

In the initial description of FIG. 4 above, the determination of the throughput requirement was performed in the mobile terminal 100. This is often convenient, since the throughput requirement is driven by user application(s) active at mobile terminal 100. In some embodiments of the present invention, such as the method depicted in FIG. 5, the throughput requirement may be determined at a fixed node in the wireless communications system, such as a Node B in a W-CDMA system. Thus, information relating to the throughput requirement may be sent to the fixed node. For instance, mobile terminal 100 may send a message to base station 110 that includes an explicit minimum throughput requirement. Alternatively, the message may indicate the application and/or a desired quality of service, so that the fixed node can determine the actual throughput requirement. In the case of a bulk transfer of data, the message may simply indicate the amount of data to be transferred.

As with the throughput requirement determination, determination of the path loss is generally performed by mobile terminal 100. Again, however, the path loss may be determined at a fixed node, such as a Node B. Accordingly, mobile terminal 100 may transmit explicit path loss data, or information related to path loss, such as received signal strength measurement data, to the Node B, so that the path loss is actually calculated in the fixed part of the wireless communications system. Again, other channel conditions may be determined by mobile terminal 100, but path loss is typically the most significant with respect to transmitter power consumption.

Thus, at block 510 of FIG. 5, throughput requirement information and path loss information are received at the network node, such as base station 110. This information may be received in one or messages sent from the mobile station 100, and may include an explicit throughput requirement and an explicit path loss parameter, or it may include information from which the network node may calculate a throughput requirement and a path loss parameter.

At block 520, the network node selects transmit parameters, including a transmit channelization scheme, for the mobile terminal 100. As before, these parameters are selected, in view of the throughput requirement information and path loss information, to minimize transmitter energy consumption at the mobile terminal 100. As before, this selection may comprise retrieving parameters from a lookup table constructed from a model of the mobile terminal 100, or, perhaps, a more general model applicable to a class of mobile terminals.

The fixed network node may then send a resource allocation message to the mobile terminal 100, as pictured at block 630, basing the resource allocation on the selected transmit parameters. This resource allocation message may comprise a schedule for transmissions by the mobile terminal 100, including allocation of time slots and specifying one or more channelization schemes, modulation formats and coding schemes. The specification of a channelization scheme may include specifying a number of subchannels to be used, as well as subchannel configuration parameters such as the spreading codes, spreading factors, and/or subchannel power levels to be applied. As previously discussed, it may be impossible or impractical to perfectly match this resource allocation to the transmit parameters that were selected to minimize energy consumption, especially if the network is heavily loaded. In this case, an allocation of resources that may result in less efficient energy use at the mobile terminal 100 may be necessary. However, in many circumstances, particularly when the network is lightly loaded, matching the schedule to the resource request is possible.

In yet another variation of the above methods, selection of transmit parameters is based not only on the throughput requirement and path loss associated with mobile terminal 100, but also takes into account resource requests from other mobile terminals. Using this approach, capacity constraints of the network are more directly accounted for in the selection of transmit parameters.

Figure 6:
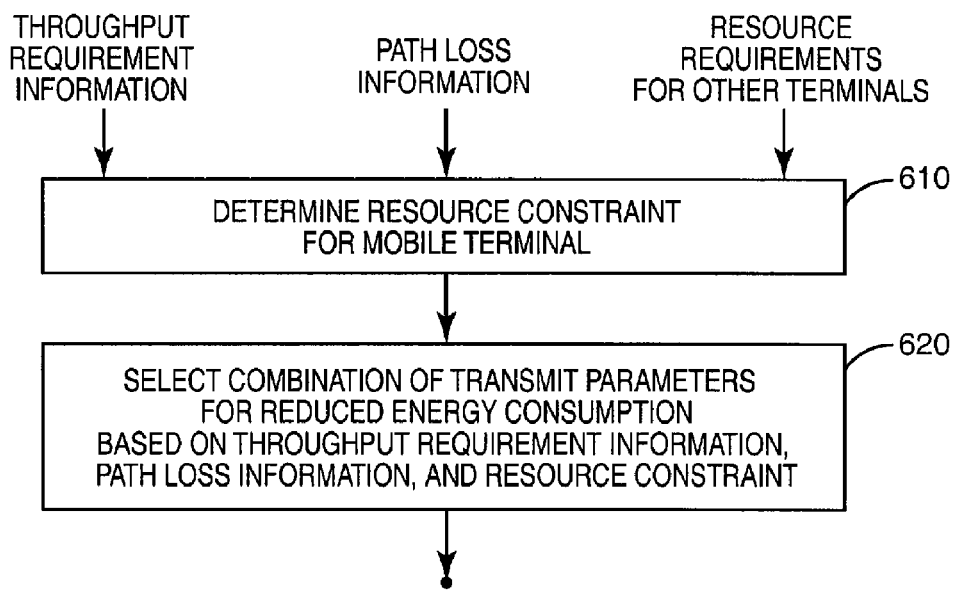
FIG. 6 is a flow diagram illustrating an alternative method for determining transmit parameters for a mobile terminal.

FIG. 6 illustrates an embodiment of this approach. As with the previously discussed methods, a throughput requirement and one or more channel conditions are determined for mobile terminal 100. In FIG. 6, path loss information is illustrated, but other channel conditions may also be used. In addition, resource allocation requirements associated with one or more other additional mobile terminals are collected. This information is evaluated at block 610 to determine a resource constraint for mobile terminal 100. The resource constraint is then used at block 620, along with the throughput requirement and the path loss information, to select transmit parameters for mobile terminal 100. As before, these selected transmit parameters are designed to reduce energy consumption at mobile terminal 100.

The resource constraint can be determined in a variety of ways. For example, resources such as time slots may be divided evenly between mobile terminals. Alternatively, resources may be divided based on the throughput requirements of the various applications running on the mobile terminals. Additional "fairness" criteria may be factored into the resource constraint as well.

In any event, the transmit parameters for mobile terminal 100 are selected at block 720, using the resource constraint as well as the throughput requirement and path loss information for mobile terminal 100. Although the resource constraint adds an additional limitation to the transmit parameter selection, the selected parameters are still designed to minimize energy consumption at mobile terminal 100, given the current circumstances.

Regardless of the method used for initially determining transmit parameters for mobile terminal 100, the transmit parameters may be periodically updated to account for changing conditions. These changing conditions may include changes in signal propagation conditions, as well as changes in the throughput requirements of the mobile. This process is similar to conventional link adaptation processes, but the adapted transmit parameters (such as channelization parameters, modulation format, and coding format) are selected to reduce energy consumption at the mobile terminal, rather than simply to maximize network throughput.

Figure 7:
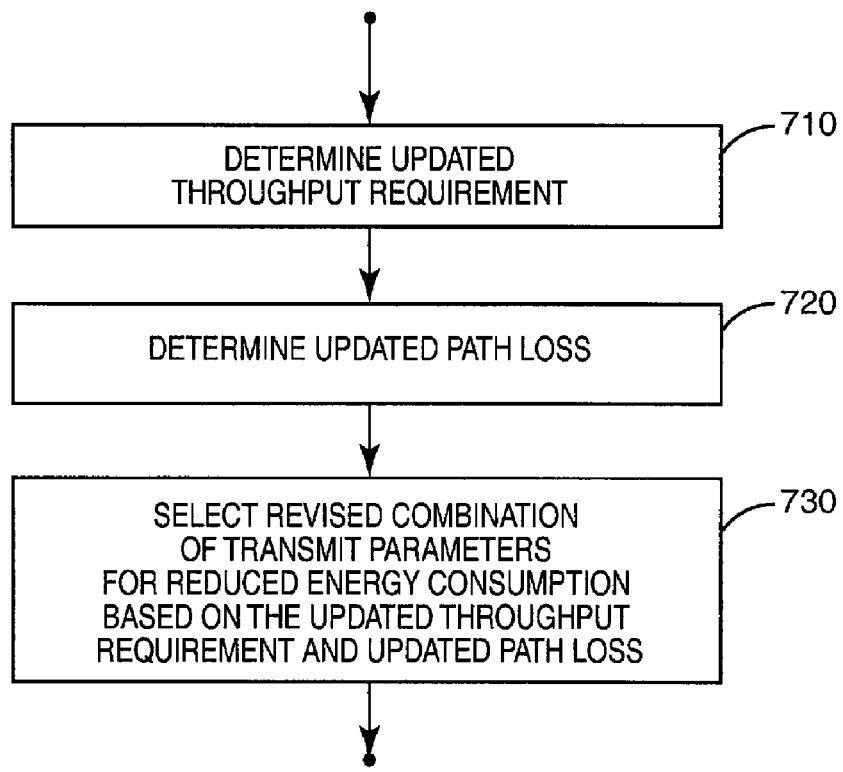
FIG. 7 is a flow diagram illustrating the updating of transmit parameters based on changed conditions.

FIG. 7 illustrates an exemplary method for revising transmit parameters for a mobile terminal based on an updated throughput requirement and an updated path loss. At block 710, an updated throughput requirement is determined. The throughput requirement may change because of changes in the applications running on the mobile terminal 100. In general, the updated throughput requirement is determined in the same manner as the initial throughput requirement was determined, but using current information.

At block 720, an updated path loss is determined. As the mobile terminal 100 moves around, signal propagation conditions will vary, sometimes dramatically. As a result, the path loss and other applicable channel conditions must be monitored and updated frequently.

At block 730, a revised combination of transmit parameters is selected based on the updated throughput requirement and the updated path loss. As before, the revised transmit parameters are designed to reduce energy consumption by the mobile terminal 100.

Not all transmit parameters must be revised at each update interval. Under many circumstances, most of the present combination of transmit parameters may remain optimal, such that only the transmit power level need be adjusted to maintain a minimum packet error rate and/or bit error rate given the signal propagation conditions. Under other circumstances, however, the changes to either or both of the throughput requirement and the path loss will be such that changes to the channelization scheme or modulation format may be desirable to minimize overall energy consumption at the mobile terminal 100. Changes to the channelization scheme may include a change in the number of subchannels, the subchannel configuration parameters, or both.

In yet another embodiment of the present invention, the resource allocation message sent to mobile terminal 100 comprises a parameter that represents a limit, rather than a fixed transmit parameter. Upon receiving this resource allocation message, mobile terminal 100 selects a particular transmitter setting to use for a data transmission from a range of settings bounded by the limit. This approach may be particularly useful when the system is lightly loaded.

In this embodiment, the resource allocation message specifies, for example, a maximum power level, or a range of modulation schemes, or both. Upon receipt of this limit or limits, mobile terminal 100 determines precisely which of the several permitted transmitter power levels or modulation schemes to use for a given transmission. This approach provides mobile terminal 100 with more autonomy to make detailed tradeoffs between throughput and energy savings.

This approach also permits mobile terminal 100 to adjust resource usage between successive transmissions with fewer messages exchanged between mobile terminal 100 and base station 110. Once a resource allocation message comprising one or more limiting parameters has been received, mobile terminal 100 adjusts the transmit settings from burst to burst in order to minimize overall energy conditions. Until conditions change, a new request for a resource allocation may be unnecessary. Once conditions have changed, for example, if the propagation loss changes significantly, or if the throughput needs of applications running on mobile terminal 100 change, then a new set of transmit parameters may be selected, and a new request for resource allocation may be sent.

Those skilled in the art will recognize that if mobile terminal 100 is provided with autonomy to choose the transmit settings actually used, then base station 110 must have a means for determining which settings were actually used. This can be done in several ways. For example, base station 110 can be provided with circuitry for determining the selected transmit parameters from the received signal characteristics. If mobile terminal 100 is provided a choice of which modulation scheme to employ, base station 110 can be provided with circuitry to detect which scheme is used, perhaps by simultaneously demodulating the received signal with several demodulators and examining the results to determine which approach yielded properly decoded bits.

Alternatively, each transmission from mobile terminal 100 may include header information, transmitted using a predictable modulation scheme. This header information, which is readily decoded by base station 110, includes information indicating precisely which transmitter settings were used by mobile terminal 100. The header information may be transmitted using a different modulation scheme than used for payload data.

Figure 8:
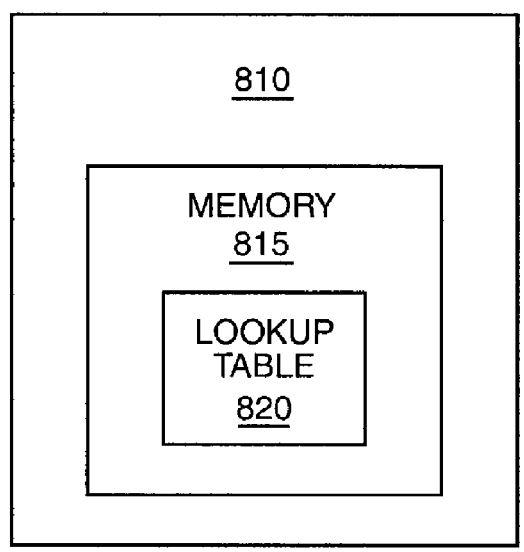
FIG. 8 is a block diagram illustrating one embodiment of a processing circuit for determining transmit parameters for a mobile terminal.

The methods described above may be implemented in a processing circuit 810, as illustrated in FIG. 8. Processing circuit 810 may be installed in mobile terminal 100, or in a fixed node of the wireless communications system. As will be readily understood by those skilled in the art, processing circuit 810 may be implemented using digital hardware, microprocessors running software, or a combination of both. Processing circuit 810 may comprise specialized or general-purpose processors, or digital signal processors (DSP), or one or more of each.

Processing circuit 810 comprises a memory circuit 815, which includes a lookup table 820 indexed by values corresponding to a throughput requirement and a path loss. Processing circuit 810 is configured to select a combination of transmit parameters for mobile terminal 100 by retrieving the appropriate combination of transmit parameters from the lookup table 820 using index values corresponding to the throughput requirement and path loss.

When processing circuit 810 is installed in mobile terminal 100, it may be further configured to send a request for an allocation of link resources based on the combination of transmit parameters. This message will be sent using message formats and protocols specific to the wireless communications system configuration. For example, in a W-CDMA system the format and protocol for this message will be defined by appropriate 3GPP standards.

When processing circuit 810 is installed in a fixed network node, such as a Node B of a W-CDMA system, it may be further configured to send a resource allocation message to a mobile terminal 100. The contents of this resource allocation message, as discussed above, are based upon the combination of transmit parameters selected by the processing circuit 910 for the mobile terminal 100.

Depending on where it is installed, processing circuit 810 will also include or be combined with additional baseband processing circuits carrying out other functions of the mobile terminal 100 or fixed network node. In particular, processing circuit 810 may comprise or be combined with circuits configured to measure path loss information, and/or to interface with user applications to determine throughput requirements. Processing circuit 810 may further be combined with wireless receiver and transmitter circuitry to provide a complete transceiver device. This transceiver device may be configured as a portable, end-user terminal, such as a cellular radiotelephone, or as a fixed communications device.

With these and other variations and extensions in mind, those skilled in the art will appreciate that the foregoing description and the accompanying drawings represent non-limiting examples of the methods and apparatus taught herein for determining transmit parameters for a data transmission by a mobile station in a wireless communications system. As such, the present invention is not limited by the foregoing description and accompanying drawings. Instead, the present invention is limited only by the following claims and their legal equivalents.

What is claimed is:

1. A method of determining transmit parameters for a data transmission between a mobile terminal and a network node in a wireless communication system, comprising:
   determining a throughput requirement and one or more channel conditions associated with the data transmission; and
   based on the throughput requirement and the channel conditions, selecting a number of subchannels and subchannel configuration parameters to minimize the total energy consumed by the mobile terminal during the data transmission.

2. The method of claim 1, further comprising sending a request for an allocation of link resources based on the selected number of subchannels and subchannel configuration parameters.

3. The method of claim 2, further comprising receiving a resource allocation message in response to the request and determining one or more transmitter settings from the resource allocation message.

4. The method of claim 3, wherein the resource allocation message comprises a limiting parameter, and wherein determining one or more transmitter settings from the resource allocation message comprises choosing one of the transmitter settings from a range of settings bounded by the limiting parameter.

5. The method of claim 1, wherein the one or more channel conditions comprise a path loss.

6. The method of claim 5, wherein the one or more channel conditions further comprise a dispersion metric.

7. The method of claim 1, wherein selecting a number of subchannels and subchannel configuration parameters comprises retrieving the number of subchannels and the subchannel configuration parameters from a look-up table indexed by a throughput parameter corresponding to the throughput requirement and a channel condition parameter corresponding to at least one of the channel conditions.

8. The method of claim 1, wherein selecting a number of subchannels and subchannel configuration parameters comprises selecting a spreading code and spreading factor for each subchannel.

9. The method of claim 1, wherein selecting a number of subchannels and subchannel configuration parameters comprises selecting a subchannel power level for each subchannel.

10. The method of claim 1, wherein the subchannel configuration parameters include a first modulation format corresponding to a first subchannel and a second modulation format, differing from the first modulation format, corresponding to a second subchannel.

11. The method of claim 1, wherein the subchannel configuration parameters include a first coding scheme corresponding to a first subchannel and a second coding scheme, differing from the first coding scheme, corresponding to a second subchannel.

12. The method of claim 1, further comprising selecting a channel modulation format and a channel coding scheme, wherein the channel modulation format, channel coding scheme, number of subchannels, and subchannel configuration parameters are jointly selected to minimize the total energy consumed by the mobile terminal during the data transmission.

13. The method of claim 1, further comprising selecting one or more transmit parameters related to a multiple-antenna transmit scheme, wherein the transmit parameters, number of subchannels, and subchannel configuration parameters are jointly selected to minimize the total energy consumed by the mobile terminal during the data transmission.

14. The method of claim 1, wherein the method is implemented at the network node, and wherein determining a throughput requirement and one or more channel conditions associated with the data transmission comprises receiving a message from a mobile terminal, the message comprising throughput requirement information and channel condition information.

15. The method of claim 14, wherein selecting the number of subchannels and the subchannel configuration parameters is further based on resource requirements associated with one or more additional mobile terminals.

16. The method of claim 1, further comprising:
   determining an updated throughput requirement for the mobile terminal;
   determining one or more updated channel conditions for the mobile terminal; and
   revising the number of subchannels, subchannel configuration parameters, or both, based on the updated throughput requirement and the one or more updated channel conditions.

17. A processing circuit for use in a node of a wireless communications system, the processing circuit configured to:
   determine a throughput requirement and one or more channel conditions associated with a data transmission between a mobile terminal and a network node; and
   select, based on the throughput requirement and the path loss, a number of subchannels and subchannel configuration parameters to minimize the total energy consumed by the mobile terminal during the data transmission.

18. The processing circuit of claim 17, wherein the processing circuit is further configured to:
   determine an updated throughput requirement for the mobile terminal;
   determine one or more updated channel conditions for the mobile terminal; and
   revise the number of subchannels, subchannel configuration parameters, or both, based on the updated throughput requirement and the one or more updated channel conditions.

19. The processing circuit of claim 17, wherein the processing circuit comprises a memory configured with a lookup table indexed by values corresponding to the throughput requirement and at least one of the channel conditions, wherein the processing circuit is configured to select the number of subchannels and the subchannel configuration parameters by retrieving the number of subchannels and the subchannel configuration parameters from the lookup table using the values.

20. A mobile terminal including the processing circuit of claim 17, wherein the processing circuit is further configured to send a request for an allocation of link resources in the wireless communication system based on the selected number of subchannels and the subchannel configuration parameters.

21. The mobile terminal of claim 20, wherein the processing circuit is further configured to receive a resource allocation message in response to the request, the resource allocation message comprising at least one limiting parameter, and wherein the processing circuit is further configured to choose a transmitter setting from a range of settings bounded by the limiting parameter.

22. A network node including the processing circuit of claim 17, wherein the processing circuit is further configured to send to the mobile terminal a resource allocation message based on the selected transmit channelization scheme.

* * * * *